(12) United States Patent
Silvestre Duarte et al.

(10) Patent No.: US 12,262,709 B2
(45) Date of Patent: Apr. 1, 2025

(54) SYSTEM FOR SCALE-DOWN THE PROCESSES OF FREEZING AND THAWING AQUEOUS SOLUTIONS OF THERMO-SENSITIVE PHARMACEUTICALS

(71) Applicant: SMARTFREEZ LDA, Porto Salvo (PT)

(72) Inventors: Andreia Filipa Silvestre Duarte, Sacavém (PT); Pedro Gil Sena Rego, Lisbon (PT); Rui De Brito Estrela, Lisbon (PT)

(73) Assignee: SMARTFREEZ LDA, Porto Salvo (PT)

( * ) Notice: Subject to any disclaimer, the term of this patent is extended or adjusted under 35 U.S.C. 154(b) by 39 days.

(21) Appl. No.: 17/463,093

(22) Filed: Aug. 31, 2021

(65) Prior Publication Data

US 2021/0392875 A1 Dec. 23, 2021

Related U.S. Application Data

(63) Continuation of application No. 16/614,295, filed as application No. PCT/IB2018/053438 on May 16, 2018, now abandoned.

(30) Foreign Application Priority Data

May 16, 2017 (PT) ........................................ 110076

(51) Int. Cl.
*A01N 1/00* (2006.01)
*A01N 1/02* (2006.01)
*F25D 23/06* (2006.01)

(52) U.S. Cl.
CPC ........... *A01N 1/0263* (2013.01); *F25D 23/06* (2013.01); *A01N 1/0268* (2013.01); *A01N 1/0278* (2013.01);

(Continued)

(58) Field of Classification Search
CPC .... A01N 1/0257; A01N 1/0263; F25D 23/06; F25D 2210/10; F17C 13/006;

(Continued)

(56) References Cited

U.S. PATENT DOCUMENTS

| 6,337,205 B1 | 1/2002 | Wisniewski |
| 6,360,545 B1 | 3/2002 | Goldstone et al. |

(Continued)

FOREIGN PATENT DOCUMENTS

| WO | 2004055456 | 7/2004 |
| WO | 2007103917 | 9/2007 |
| WO | 2015114516 | 8/2015 |

OTHER PUBLICATIONS

Satish K Singh et al, "Large-Scale Freezing of Biologics: A Practitioner's Review, Part 2: Practical Advice", Bioprocess International, (Nov. 1, 2009), vol. 7, No. 10, pp. 34-42, XP055506757.

(Continued)

*Primary Examiner* — Brian M King
(74) *Attorney, Agent, or Firm* — Leason Ellis LLP (57) ABSTRACT

This disclosure relates to scale-down systems for freezing and thawing aqueous liquid mixtures of thermo sensitive substances. In at least one aspect, the system can comprise a first container that has a head-space and a liquid-space, with a substantially constant average transversal cross-section area in the liquid-space that does not change substantially with height. The first container holds a volume of liquid for a height of liquid, has a lateral active heat transfer area having an insulated lateral area ALIM, and has an equivalent radius sized to reproduce the equivalent radius of a second container. The first container further has a lateral heat transfer area in contact with the liquid-space. The first container is smaller than the second container, and the insulated lateral area is equal to or greater than the lateral active heat transfer area.

22 Claims, 7 Drawing Sheets

(52) U.S. Cl.
CPC ........ *A01N 1/0284* (2013.01); *F25D 2201/10* (2013.01)

(58) Field of Classification Search
CPC ............ F17C 13/086; F17C 2201/0104; F17C 2203/012; F17C 2203/03
See application file for complete search history.

(56) References Cited

U.S. PATENT DOCUMENTS

| | | |
|---|---|---|
| 6,453,683 B1 | 9/2002 | Wisniewski et al. |
| 7,228,688 B2 | 6/2007 | Voute et al. |
| 2004/0006999 A1 | 1/2004 | Brown et al. |
| 2005/0016198 A1 | 1/2005 | Wowk et al. |
| 2015/0191291 A1 | 7/2015 | Wood et al. |

OTHER PUBLICATIONS

Shamlou Parviz A, Breen Lawrence H, Bell Willis V, Pollo Mark, Thomas Beth Ann, "A new scaleable freeze-thaw technology for bulk protein solutions", Biotechnology and Applied Biochemistry, (Jan. 1, 2007), vol. 46, No. 1, doi:10.1042/BA20060075, pp. 13-26, XP009508024.

Kilbride Peter et al, "A scale down process for the development of large volume cryopreservation", Cryobiology, Academic Press Inc, US, (Sep. 16, 2014), vol. 69, No. 3, doi:10.1016/J.CRYOBIOL. 2014.09.003, ISSN 0011-2240, pp. 367-375, XP029101811.

K. Ho; S. Tchessalov; A. Kantor; N. Warne, Development of Freeze and Thaw Processes for Bulk Biologics in Disposable Bags. Am. Pharm. Rev., (20080000), vol. 11, No. 4, pp. 1-6.

International Search Report and Written Opinion dated Sep. 26, 2018, corresponding to International Patent Application No. PCT/IB2018/053438; 12 pages.

SYSTEM FOR SCALE-DOWN THE PROCESSES OF FREEZING AND THAWING AQUEOUS SOLUTIONS OF THERMO-SENSITIVE PHARMACEUTICALS

CROSS REFERENCE TO RELATED APPLICATIONS

This application is a continuation application of U.S. application Ser. No. 16/614,295, filed Nov. 15, 2019, which is a U.S. National Stage Application under 35 U.S.C. § 371 of International Patent Application No. PCT/IB2018/053438, filed May 16, 2018, which claims priority to Portugal Application No. 110076, filed May 16, 2017, all of which are hereby incorporated by reference in their respective entireties.

TECHNICAL FIELD

The present disclosure relates to a system for scale-down the process of freezing and thawing aqueous liquid mixtures of thermo sensitive substances. In particular, this disclosure relates to a scale-down system for freezing and thawing aqueous liquid mixtures of thermo sensitive substances comprising a small container that has a head-space and a liquid-space, with a substantially constant average transversal cross-section area ATM in the liquid-space that does not change substantially with height, holding a volume of liquid VM for a height of liquid HM, having a lateral active heat transfer area ALM, having an insulated lateral area ALIM, having an equivalent radius RM defined as 2ATM/(ALM/HM), sized to reproduce the equivalent radius of a large container holding a volume of liquid VL at a height of liquid HL, with a transversal cross-section area ATL that does not change substantially with height, having a lateral heat transfer area ALL in contact with the liquid-space and an equivalent radius RL defined as 2ATL/(ALL/HL) said scale-down system characterized in that ALIM is equal or greater than ALM.

One aspect of the invention also describes that the active heat transfer surface of the scale-down container can be attached to a heat exchanger having a precise heat transfer coefficient. Further, the system may include a scale-down container wherein the cross-section is triangular and two sides of the triangular cross-section are insulated. Also, the system may include a scale-down container wherein the cross-section of is trapezoidal and three sides of the trapezoidal cross-section are insulated.

BACKGROUND

Freezing and thawing are essential processes for production, storage and distribution of biological products, or thermo-sensitive pharmaceutical substances, worldwide. However, these processes have the potential to damage these thermo-sensitive substances, compromising quality and safety. Freeze-thaw processes must therefore be carefully designed and optimized for each product, for example by selecting the most suitable cooling (or heating) rates or the optimal concentrations of stabilizing excipients. The optimization process typically relies on multiple experiments at smaller scale because the pharmaceutical substances have high production costs, specially the biological products (such as recombinant proteins) during development stages (in K. Ho, S. Tchessalov, A. Kantor, and N. Warne Am. Pharm. Rev., vol. 11, no. 4, pp. 1-6, 2008). For this reason, it is highly desirable to have small-volume freeze-thaw processes capable of mimicking the large-scale manufacturing (commercial scale) process.

Most of the times the large-scale equipment for commercial manufacturing is already installed and therefore it is desirable to design a small-volume method (a scale-down model) to test the biological product in conditions that are representative of the processing in large-scale. However, it is difficult to find the processing parameters that enable the biological product to undergo equivalent thermo-chemical stresses during freezing and thawing in volumes that typically are 100 to 1000 times smaller than the volumes of the large-scale equipment.

The generalized approaches used for scale-down fall into 2 classes. The first consists in submitting the small container (scale-down container) to the same external conditions of the large container, as for example by placing both containers inside the same freezer. However, due to the disparity between their dimensions, which can differ from 10 mL to 100 mL for the scale-down to 1 L to 20 L of the large-scale, the same external conditions result in much different rates of freezing or thawing, i.e. in poor correspondence of the local time-temperature profiles between both scales.

Alternatively, the agreement of local time-temperature profiles between the two scales can be improved by manipulating the external conditions of the scale-down, which constitutes the second type of the approaches. External temperature, for example, can be manipulated so that the scale-down freezes or thaws in the same time of the large container, or displays equivalent time-temperature profiles at a selected point—typically at the center. While apparently more rational, this scale-down strategy has major caveats, because some of the most critical phenomenon for freezing or thawing, such as natural convection or nucleation (in freezing) are highly dependent of the temperature difference established between the container walls and the product that is inside. Therefore, by manipulating external temperature, such as implementing a lower cooling or heating rate for the scale-down will cause significantly different spatial distributions of thermal histories to take place, despite that the total processing time may be equivalent. Others have attenuated this limitation by conserving some characteristic dimensions between the large and the small-scale (CryoWedge and Celsius systems) (in K. Ho, S. Tchessalov, A. Kantor, and N. Warne Am. Pharm. Rev., vol. 11, no. 4, pp. 1-6, 2008). For example, U.S. Pat. No. 7,228,688B2 discloses a small bag that maintains one dimension between scales, of the 3 dimensions of the large bag (Celsius). Other example is a commercialized as CryoWedge, which consists in a wedge of equivalent radius of the large freeze-thaw container the Cryovessel. This strategy improves the correspondences between scales, with less manipulation of the external conditions of the small-scale. However, it relies on auxiliary equipment to implement the freezing/thawing conditions, which have overall heat transfer coefficients in the active heat transfer walls that are substantially different from the corresponding ones in the large-scale system.

One important limitation of this strategy of using small scale systems that conserve some characteristic dimensions of the large-scale system, is that it cannot be used with systems, such as plastic carboys, that do not have an obvious characteristic dimension that is preserved between scales. Another important limitation is that the manufacturing equipment may have significant operational thermal variations, which may not be anticipated or reproduced in different small-scale equipment. For example, 10 L or 20 L containers are often frozen on top of the shelves of freezers. The freezing and storage will therefore depend of the amount of containers inside the freezer, or the number of times the freezer is open to introduce or remove more containers. The ideal scale-down method should enable the small container to freeze or thaw in the same equipment of the commercial manufacturing scale, so that the impact of other operational variables could also be diagnosed, either for products under development or for products displaying unexpected quality issues.

The present disclosure aims at solving the above-mentioned problems.

SUMMARY

This disclosure discloses a new approach for scale-down of the freezing and thawing process of thermo-sensitive pharmaceutical substances, which enables the scale-down container to experience equivalent freezing and thawing of the large container, when both are placed under the same external thermal conditions. In a first aspect of the disclosure, this is achieved by insulating at least 50% of the area of the lateral walls of the scale-down container. This method can be easily implemented, to high regulatory standards, by using an insulating shell, which can also be adapted to many containers available in the market.

In a second aspect of the disclosure, the fraction of the lateral walls of the scale-down container that must be insulated is specified by making the equivalent radius of the scale-down container equal to the equivalent radius of the large container, wherein the equivalent radius is equal to two times the volume of holding product in the liquid-state divided by the area of the lateral active heat transfer surface.

In a third aspect of the disclosure, the scale-down container is designed to hold a height of liquid that is equal to the one of the large-scale container.

In a fourth aspect of the disclosure, the scale-down container is designed to have an average overall heat transfer resistance in the lateral active heat transfer walls that is equivalent to the corresponding heat transfer resistance of the large container.

In a fifth aspect, the bottom and the head-space of the scale-down container have an overall thermal resistances identical to the ones of the large-scale system.

BRIEF DESCRIPTION OF THE DRAWINGS

These and other objects, features and advantages of the disclosure will be evident from the following detailed description when read in conjunction with the accompanying drawings.

GENERAL DESCRIPTION

The present disclosure relates to a system 10, 10a, 10b, 30, 800, 900, in particular a scale-down system 10, 10a, 10b, 30, 800, 900, for freezing and thawing aqueous liquid mixtures of thermo sensitive substances, the system comprising: a holder for holding a first container 100, 600, 801, 901 and an insulator 300, 700; wherein the holder is outwardly surrounded by the insulator 300, 700 such that the insulator 300, 700 insulates at least 50% of holder and such that heat transfer between the first container and a second container is equivalent.

This aspect of the disclosure may therefore be described as a scale-down system and method for freezing and thawing aqueous liquid mixtures of thermo sensitive substances comprising a small container that has a head-space and a liquid-space, with a substantially constant average transversal cross-section area ATM in the liquid-space that does not change substantially with height, holding a volume of liquid VM for a height of liquid HM, having a lateral active heat transfer area ALM, having an insulated lateral area ALIM, having an equivalent radius RM defined as 2ATM/(ALM/HM), sized to reproduce the equivalent radius of a large container holding a volume of liquid VL at a height of liquid HL, with a transversal cross-section area ATL that does not change substantially with height, having a lateral heat transfer area ALL in contact with the liquid-space and an equivalent radius RL defined as 2ATL/(ALL/HL) said scale-down system characterized in that ALIM is equal or greater than ALM.

In an embodiment, HM is approximately equal to HL.

In an embodiment, RM is approximately equal to RL.

In an embodiment, HM is approximately equal to HL and RM is approximately equal to RL.

In an embodiment, the material of the walls of the small container is the same of the walls of the large container and the ratio of average wall thickness between the small and large container is in the range between 0.5 and 1.5, but preferentially between 0.8 and 1.2.

In an embodiment, the bottom surface of the scale-down container and of the large container are insulated.

In an embodiment, the surface around the head-space region is insulated both in the scale-down container and in the large container.

In an embodiment, the active heat transfer surface of the scale-down container is attached to a heat exchanger.

In an embodiment, the cross-section of the scale-down container is triangular and two sides of the triangular cross-section are insulated.

In an embodiment, the cross-section of the scale-down container is trapezoidal and three sides of the trapezoidal cross-section are insulated.

In an embodiment, the average overall heat transfer coefficient of the insulation layers is lower than 5 J/(m2·s·K).

In an embodiment, a small low-conductivity bar, strait or curved, with a diameter less than 5 mm, with a thermal conductivity less than 0.5 W m$^{-1}$ K$^{-1}$, is inserted inside the container and attached to the wall of the container in the head-space or opening regions and ends in the region furthest away from the thermal active walls.

In an embodiment, the insulator 300 of the system now disclosed 10, 10a, 10b, 30 may comprise a deformable layer 301 arranged for contacting the first container 100. The advantage is to promote a good contact between the lateral walls of the scale-down container and the deformable layer, ensuring that there is no air convection within the two surfaces, thus maximizing the thermal insulation.

In an embodiment, said deformable layer 301 is made of a resilient material having low thermal conductivity, preferably wherein the deformable layer 301 is made of extruded polystyrene foam, polyurethane foam or acrylonitrile butadiene rubber. The advantage is to promote a good contact between the lateral walls of the scale-down container and the deformable layer, ensuring that there is no air convection within the two surfaces, thus maximizing the thermal insulation.

In an embodiment, the insulator 300 of the system now disclosed 10, 10a, 10b may also comprise a frame 304 arranged for pressing the first container 100 against the deformable layer 301 such that thermal insulation is maximized.

In an embodiment, the insulator 300, 700 of the system now disclosed 10, 10a, 10b, 30 may further comprise an insulation layer 303. The advantage of this is to insulate the bottom of the container, ensuring that the vertical heat transport is negligible.

In an embodiment, the insulator 300, 700 of the system now disclosed 10, 10a, 10b, 30 may have a cavity 302, 702 arranged to be filled with a thermal insulation material or a phase change material.

In an embodiment, the phase change material may be selected from the following list: a mixture of water and ethylene glycol, a mixture of water and sodium chloride, or a mixture water and ethanol, provided that the phase change material has the same osmolality of an aqueous liquid mixtures of thermo sensitive substance.

In an embodiment, the phase change material may further comprise a nucleating agent, in particular wherein the nucleating agent is selected from silver iodide or lead iodide.

In an embodiment, the system 10, 10a, 10b, 30, 800, 900 now disclosed may also comprise a second insulator 500 for insulating a head-space region of the first container 100, 600, 801, 901. The advantage of having the second insulator 500 is to insulate the head-space region of the bottle ensuring that the vertical heat transport is negligible.

In an embodiment, the second insulator 500 may have a layer of a phase change material such that thermal insulation is maximized.

In an embodiment, the system 10, 10a, 10b, 30, 800, 900 now disclosed may comprise a first removable heat exchanger 400 having fins 401 and a second insulation layer 403 attached to a metallic support 402. The advantage of a system with said features is to uniform heat exchange over the exposed area.

In an embodiment, the second insulation layer 403 may have a thickness configured for obtaining an overall heat transfer coefficient between 1-100 W m$^{-2}$ K$^{-1}$, preferably between 1-10 W K$^{-1}$ for natural air convection or between 10-100 W m$^{-2}$ K$^{-1}$ for forced air convention.

In an embodiment, the second insulation layer 403 may be made of a plastic selected from poly-ethylene, polypropylene, polycarbonate, polylactic acid, or is made of an elastomer selected from natural rubber, isoprene rubber, butadiene rubber, styrene-butadiene rubber or nitrile rubber. The advantage of this is to control heat resistance while providing uniform heat exchange over the exposed area.

In an embodiment, the fins 401 and metallic support 402 may be made of a metal, alloy or a high conductivity polymer. In particular and for obtaining even better results, the fins 401 and the metallic support 402 are made of a material with a thermal conductivity higher than 2 W K$^{-1}$, preferably higher than 10 W m$^{-1}$ K$^{-1}$. The advantage of this is to provide larger contact area with circulating coolant (air).

In an embodiment, the heat exchanger 400 of the system now disclosed 800, 900 may be a circular heat exchanger.

In an embodiment, the system now disclosed 10, 10a, 10b, 30, 800, 900 may comprise a second removable heat exchanger for using in a thawing process.

In an embodiment, the system now disclosed 10, 10a, 10b, 30, 800, 900 may further comprise a metallic block with internal flow of a temperature-controlled fluid or by a thermoelectric element whose temperature is controlled by electric current. The advantage of a system with said features is to uniform heat exchange over the exposed area.

In an embodiment, the first container, in particular the scale-down container 100, 600, 801, 901 may be a bottle.

DETAILED DESCRIPTION

In this section, it will be described the fundamentals of the operation of the object of disclosure and of proposed embodiments.

Typical plastic containers (bottles) used in the pharmaceutical industry for freezing and thawing under static conditions have a head-space and a liquid-space, with less than 20% variation in average transversal cross-section area in the liquid-space that does not change substantially (more than 20%) with height. Our freeze experiments with this type of containers revealed that the time evolution of the shape of the frozen mixture exhibits symmetry in particular vertical planes. If the container is cylindrical, for instance, there is symmetry in every vertical plane that passes by the vertical axis of the bottle. If the container has a square cross-section area, there are height vertical planes of symmetry that pass through the vertical axis. These planes delimit eight portions of the container that have the same shape. If the container has a hexagonal cross-section area, for instance, there are twelve vertical planes of symmetry that pass through the vertical axis. Across each symmetry plane, the heat transfer is zero, due to the symmetry condition. These conditions apply also to the thawing step, if the frozen mixture is immobilized with the help of an internal vertical and central bar or tube that is connected to the opening of the bottle or to the bottle's wall in the head-space region. This procedure prevents the chaotic fluctuation of the central froze block that detaches from the walls as soon as the peripheral ice begins to melt, and whose position if impossible to predict.

Equivalent radial time-temperature profiles can therefore be achieved between the two scales (large-scale and scale-down) when the scale-down container has the shape of the section of the large-scale container comprised between two adjacent symmetric planes, which are thermally insulated lateral walls, and when the heat transfer conditions in the thermal active walls are identical between the two systems. By identical, we mean that both the temporal temperature profiles of the external heating/cooling medium and the average heat transfer coefficient are identical in both systems.

With large containers that do no exhibit symmetry planes, but have a transversal cross-section whose area, below the head-space region, does not change substantially in the vertical direction, we realized that it is still possible to determine an equivalent radial dimension that is typical of those containers. For example, typical containers used for biopharmaceutical applications have a transversal cross-section below the headspace that does not change more than 20% in the vertical direction.

Containers with different shapes, but with the same equivalent radial dimension and the same height of liquid, exhibit a similar radial time-temperature evolution, either during freezing or thawing, when the external conditions of heat transfer are the same in both small and large-scale systems.

The equivalent diameter of the large containers is best defined as the wet volume of the container, i.e. the volume of liquid inside the container, divided by the wet area of the lateral walls. In this methodology, only the volume and lateral area below the head-space of the container is considered.

The concept of equivalent radius enables to use any small container as a scale-down of a large container, simply by insulating a fraction of the lateral area that produces an equivalent radius equal to the one of the large container. The similarity of the freeze and thaw processes between the two bottles requires, of course, that the liquid level is the same in the two bottles, and the overall heat transfer coefficient in the thermal active walls is also the same between the two containers. Different containers with the same equivalent radius have also the useful property of having the same lateral thermal active surface area by unit of volume.

This aspect of the disclosure may therefore be described as a scale-down system and method for freezing and thawing aqueous liquid mixtures of thermo sensitive substances comprising a small container that has a head-space and a liquid-space, with a substantially constant average transversal cross-section area ATM in the liquid-space that does not change substantially with height, holding a volume of liquid VM for a height of liquid HM, having a lateral active heat transfer area ALM, having an insulated lateral area ALIM, having an equivalent radius RM defined as 2ATM/(ALM/HM), sized to reproduce the equivalent radius of a large container holding a volume of liquid VL at a height of liquid HL, with a transversal cross-section area ATL that does not change substantially with height, having a lateral heat transfer area ALL in contact with the liquid-space and an equivalent radius RL defined as 2ATL/(ALL/HL)said scale-down system characterized in that ALIM is equal or greater than ALM.

If the liquid level is not the same between the small and the large container, the temporal evolution of the shape of the frozen mixture in the vertical direction will differ between the two containers. In that particular case, it is recommended to insulate both the bottom and the head-space regions of the two containers, to ensure that the vertical heat transport will be negligible. Under these conditions, the ice will grow only in the direction from the lateral walls to the center of the container, and the freeze/thawing process is then controlled only by the equivalent radius of the bottles.

A good thermal insulation of the lateral walls of the scale-down container may require very thick layers of insulating materials. To reduce this thickness and render the scale-down device more practical, a phase change material may be placed inside the layer of insulating material. In this case, it is also advantageous to introduce a nucleating agent, such as fine particles of silver iodide or lead iodide, inside the phase change material, to ensure that the phase change material will not supercool during the freezing process. Preferentially, the phase change material is a pure liquid or liquid mixture with a freezing temperature identical to the one of the biopharmaceutical mixture, which lies typically between −5° C. and 0° C. The phase change material can be, for instance, a mixture of water and ethylene glycol, or water and sodium chloride, or water and ethanol, with the same osmolality of the biopharmaceutical solution. The thermal insulation material can be any material with a thermal conductivity less than 0.5 W m$^{-1}$ K$^{-1}$, such as polystyrene, polyurethane foam, fiberglass, mineral or wool cellulose.

As mentioned before, the thermal similarity between the large and the scale-down container requires that the temporal profile of the temperature of the heat transfer medium is the same in the two systems and additionally that the overall heat transfer coefficients in the two systems are also identical. These conditions can be fulfilled if the wall thickness of the two containers is equivalent and if the external heat transfer condition is also identical. Typically, the ratio of average wall thickness between the small and large container should be in the range between 0.5 and 1.5, but preferentially between 0.8 and 1.2.

If, for practical reasons, the scale-down container is placed in a heat transfer medium with a different external heat transfer coefficient, it is necessary to use a heat exchanger described below. An insulation layer with a precise thickness may be placed between the active heat transfer walls and the metallic support of the fins. The fins are used to ensure that temperature is similar to the temperature of the heat transfer medium and uniform in the metallic support. With this method, it is then possible to impose a given heat transfer coefficient by adjusting both the thermal conductivity and the thickness of the layer. The heat exchanger can be attached to the small container's active heat transfer walls by mechanical means, magnetic means or with compatible adhesive materials.

Figures 1A, 1B:
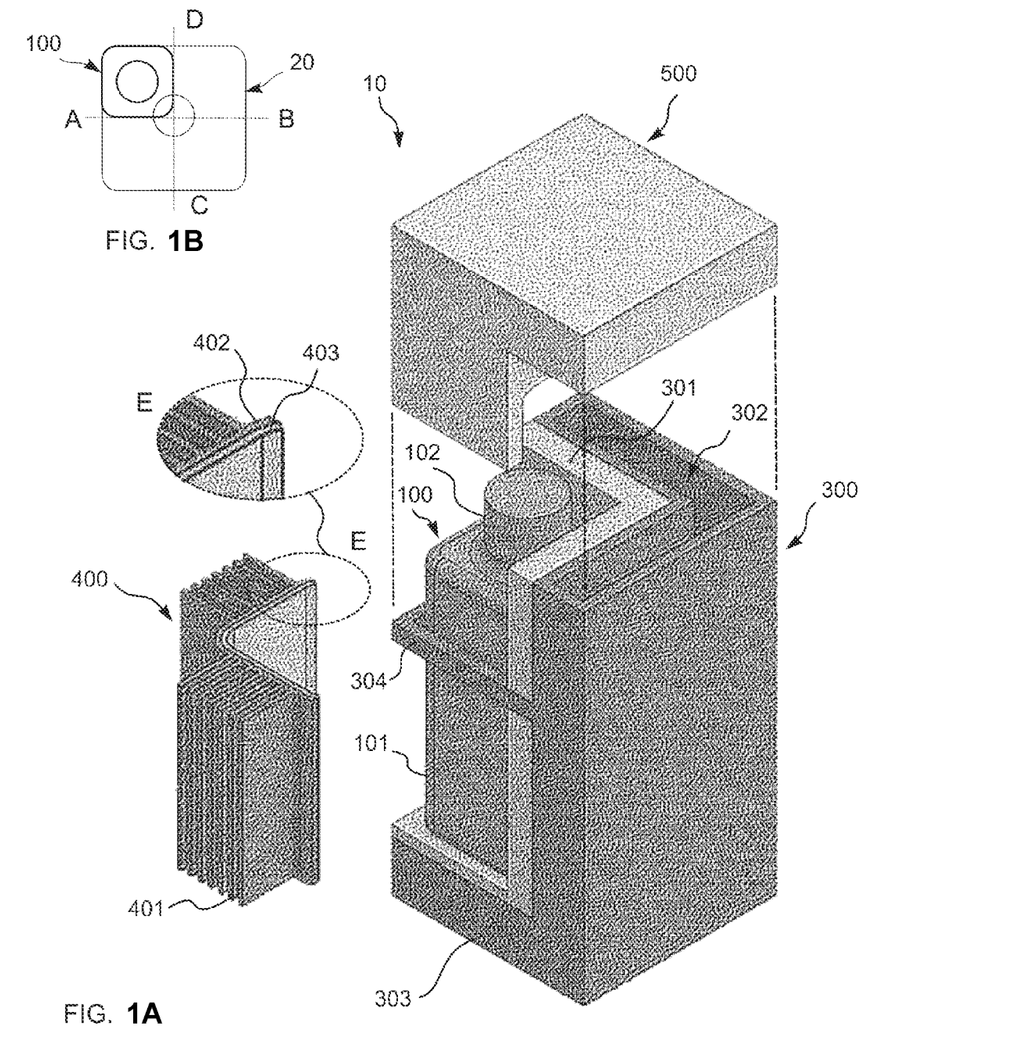
FIG. 1A is a partial exploded and elevated view of a scale-down system 10 in accordance with present disclosure.
FIG. 1B is a schematic cross-section view of a large container 20 and a scale-down container 100.
Figure 2:
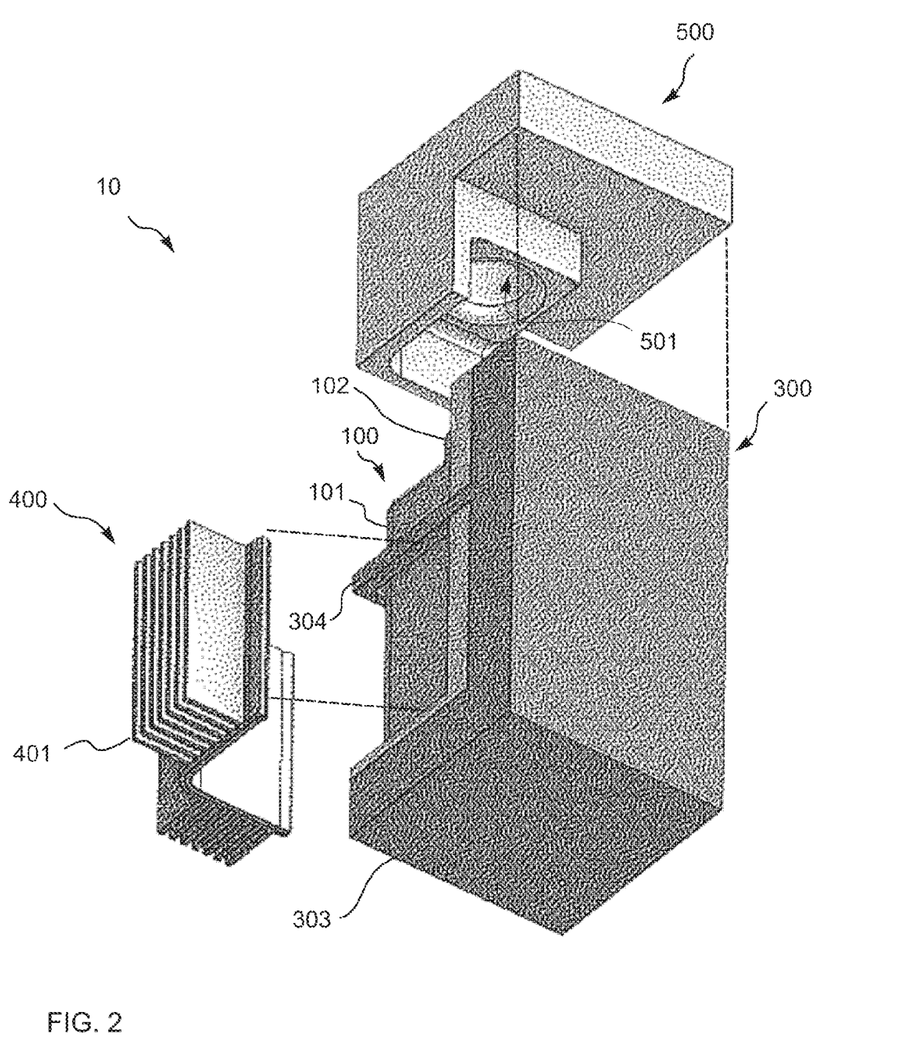
FIG. 2 is a partial exploded and bottom view of a scale-down system 10 in accordance with present disclosure.

One exemplary embodiment of the present disclosure is depicted in FIGS. 1A-1B and 2. The scale-down system 10 has a scale-down container 100 of square cross-section that is fitted into the insulator 300. The scale-down container 100 in this particular embodiment is a scale-down of a large container 20 with a square cross-section area, as illustrated schematically in FIG. 1B. Furthermore, it is assumed that the large container 20 has insulation in the head space and in the bottom. From FIG. 1B, it is evident why the system 10 is a good scale-down of the large container 20. Indeed, the vertical planes of symmetry AB and CD in FIG. 1B delimit four identical regions of the large container 20. Each one of these four regions have two internal adiabatic lateral walls and two external heat transfer active lateral walls. By insulating the lateral walls of the scale-down container 100 that pass by the planes of symmetry AB and CD, we obtain a scale-down container of the large container 20, provided the liquid height is the same in the two containers and the heat transfer conditions in the heat transfer active walls are also the same. In particular, the average overall heat transfer coefficient in the active heat transfer walls must also be the same.

In the embodiment of the scale-down system depicted in the FIGS. 1A-1B and 2, two lateral walls of the scale-down container 100 are pressed against a deformable layer 301. The deformable layer 301 may be made, preferentially, of any resilient or soft material with low thermal conductivity, such as extruded polystyrene foam, polyurethane foam or acrylonitrile butadiene rubber.

The frame 304 presses the scale-down container 100 against the deformable layer 301. A good contact between the lateral walls 101 of the scale-down container and deformable layer 301 ensures that there is no air convection within the two surfaces, thus maximizing the thermal insulation.

The pressure required for getting a good contact between the scale-down container 100 and the deformable layer 301 is generated when the scale-down container is inserted into the insulator 300 and is pressed against the frame 304.

Besides the deformable layer 301, the insulator 300 has also an additional insulation layer 303, with an internal cavity 302. This internal cavity 302 can be filled with a thermal insulation material or with a phase change material.

A top insulator 500 insulates the head-space region of the bottle, above the liquid level. In FIG. 2 it is depicted a cavity 501 where the cap 102 fits. In another embodiment, the top insulator 500 can have also an internal layer of phase change material to improve the thermal insulation.

The embodiment 10 has a heat exchanger 400 with fins 401 attached to a metallic support 402. Both the fins 401 and the metallic support 402 are made of a material with a thermal conductivity higher than 2 W m$^{-1}$ K$^{-1}$, but preferentially higher than 10 W m$^{-1}$ K$^{-1}$. An insulation layer 403 is attached to the metallic support 402. The thickness of the insulation layer 403 is adjusted in order to obtain the same average overall heat transfer coefficient of the lateral walls of the large container in normal operating conditions, below the head space region. Typically, the overall heat transfer coefficient lies between 1 and 10 W m$^{-2}$ K$^{-1}$, for natural air convection and between 10 and 100 W m$^{-2}$k$^{-1}$, for forced air convection.

In another embodiment, a second heat exchanger similar to 400 can be used for the thawing process. In this case, the first heat exchanger 400 is used during the freezing process, after the freezing process is removed and replaced by the second heat exchanger for the subsequent thawing process. The thickness of the metallic support 402 in the second heat exchanger is adjusted in order to obtain the same average heat transfer coefficient of the large container in the thawing process.

The metallic support 402 can be made of a metal, alloy or a high conductivity polymer. The insulation layer 403 can be made of a plastic, such as poly-ethylene, polypropylene, polycarbonate, polylactic acid, or of an elastomer, such as natural rubber, isoprene rubber, butadiene rubber, styrene-butadiene rubber or nitrile rubber. The insulation layer 403 in one embodiment is attached to the lateral walls 101 of the scale-down container 100 and to the metallic support 402 by means of compatible adhesive material, or by magnetic contact, using magnetic materials for that purpose.

The heat exchanger 400 can be eliminated if the scale-down system is to be placed in a freezer and in a heater with forced convection, such that the average heat transfer coefficient is approximately equal to the corresponding one of the large container in the normal operating conditions.

Figures 3A, 3B:
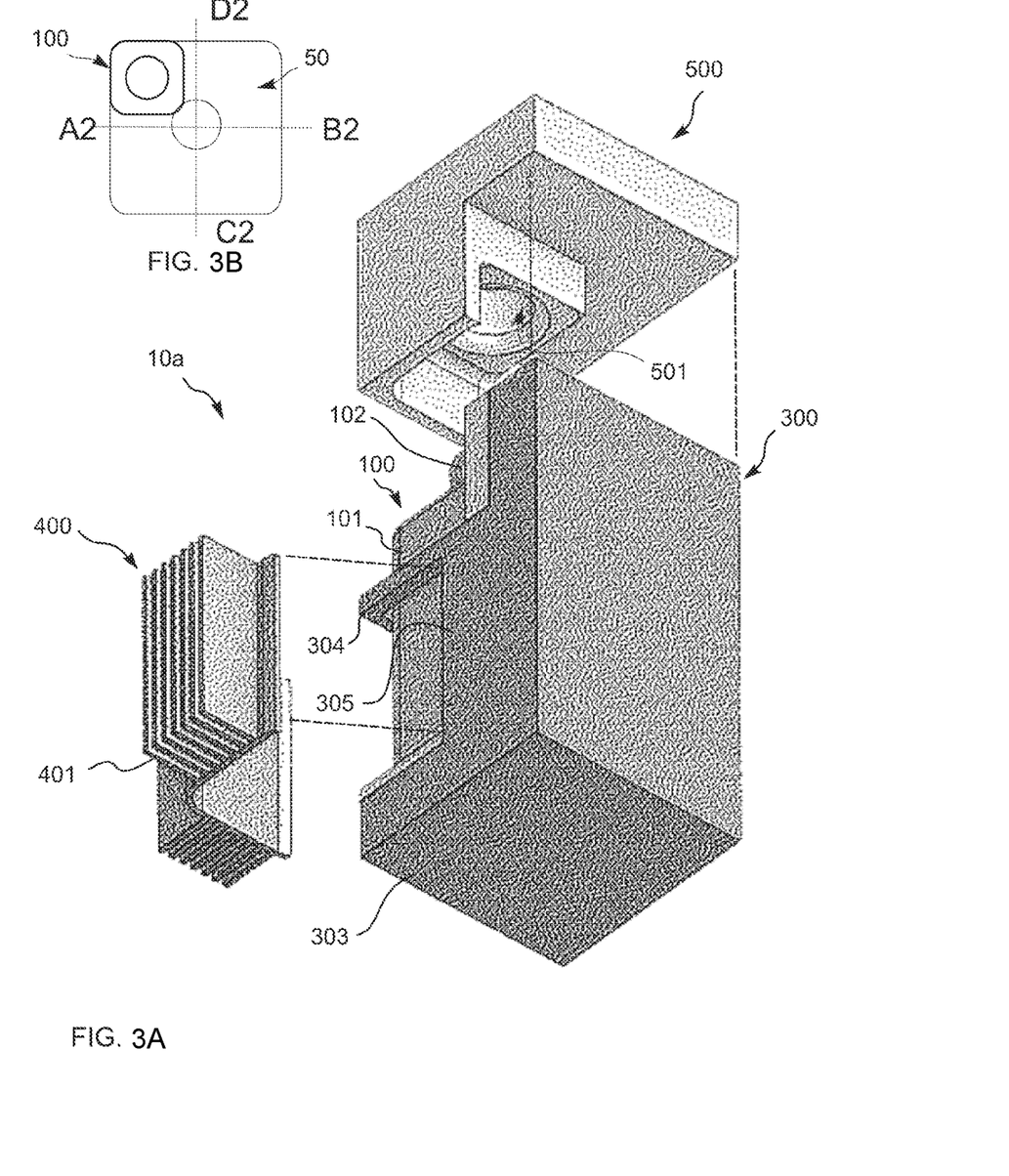
FIG. 3A is a partial exploded and bottom view of another scale-down system 10a in accordance with present disclosure.
FIG. 3B is a schematic cross-section view of another large container 50 and a scale-down container 100.

If the scale-down container has a volume lower than the volume of the region comprised between the planes AB and CD displayed in FIG. 1B, it may be necessary to reduce the lateral heat transfer active area of the scale-down container, in order to ensure that the equivalent radius of the scale-down container is equal to the equivalent radius of the large container. As shown in FIG. 3B, the cross-section area of the scale-down container in this case is smaller than the cross-section area of the region of the larger container comprised between the vertical planes A2-D2 and C2-D2. This situation may arise for practical reasons, if we want to use the same scale-down container as a scale-down model for large containers with different volumes. By reducing the area of the active lateral heat transfer walls of the scale-down container, it is possible to ensure that the equivalent radius of the scale-down container is equal to the equivalent radius of the large container that we want to model. In the embodiment depicted in FIG. 3A, it is possible to reduce the area of the lateral active heat transfer walls by extending the insulation walls of the insulator to the region 305.

Figure 4:
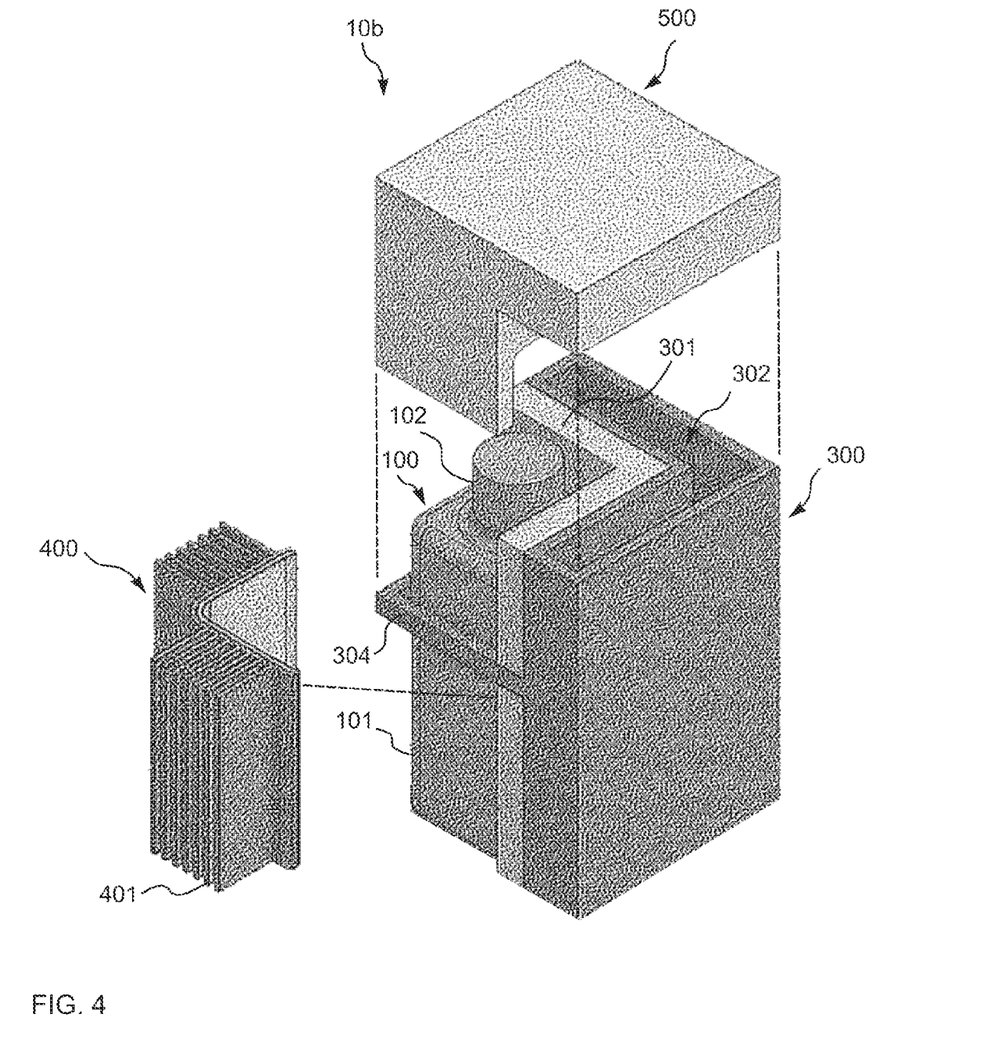
FIG. 4 is a partial exploded and elevated view of a scale-down system 10b in accordance with present disclosure.

In another embodiment, it may be useful to eliminate the thermal resistance in the bottom of the scale-down container. This occurs, preferentially, when the large container is placed directly in contact with a cooled or heated surface. With very large bottles, this mode of operation may be attractive, because it helps to create a cooled spot on the bottom of the container that contributes to speed-up and control the ice nucleation. By keeping the bottom of the scale-down container not insulated, and by placing the scale-down container on the top of a cooled or heated surface in the same thermal conditions of the large system, the nucleation will be fast and controlled in both systems. The embodiment of the scale-down system depicted in FIG. 4 is similar to the one depicted in FIGS. 1A and 2, but has the bottom of the scale-down container exposed. Preferentially, the average thermal resistance of the bottom surface of the scale-down container should be equal to the corresponding one of the large container.

Figure 5:
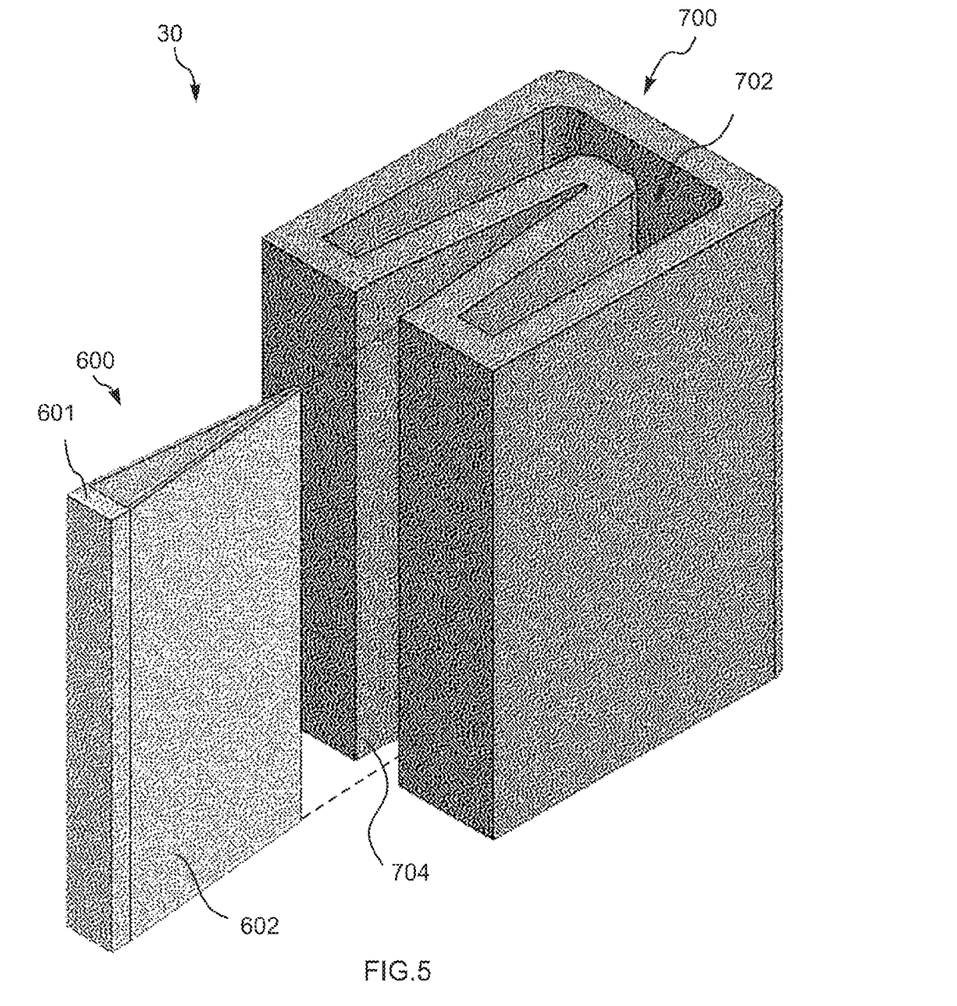
FIG. 5 is an exploded and top view of another scale-down system 30 in accordance with present disclosure.

The device 30 of FIG. 5 has a scale-down container 600 with a triangular cross-section that fits into an insulator 700. By a careful selection of the total transversal depth of the scale-down container 600 it is possible to get the equivalent radius of the large container and, at the same time, to have a transversal length scale that is also close to the one of the large container. The scale-down container has an outer active heat transfer wall 601 whose thickness must be specified in order to obtain an average overall heat transfer coefficient identical to the corresponding heat transfer coefficient of the large container. In another embodiment, the outer active heat transfer wall 601 can be attached to a heat exchanger 400, as explained before. The insulator 700 has an internal cavity 702 that can be filled with a phase change material, whose function was already described. The lateral walls 602 of the scale-down container 600 fits tightly into the internal insulated walls 704 of the insulator 700. In another embodiment, lateral walls 602 are attached to the internal insulated walls 704. In another embodiment, the cross-section of scale-down container 600 has a trapezoidal shape wherein the width of the outer active heat transfer wall 601 is smaller than the width of the opposite wall. In another embodiment, the top and the bottom of the insulator 700 is insulated with an additional part similar to the part 500 displayed in FIGS. 1-4.

Figure 6:
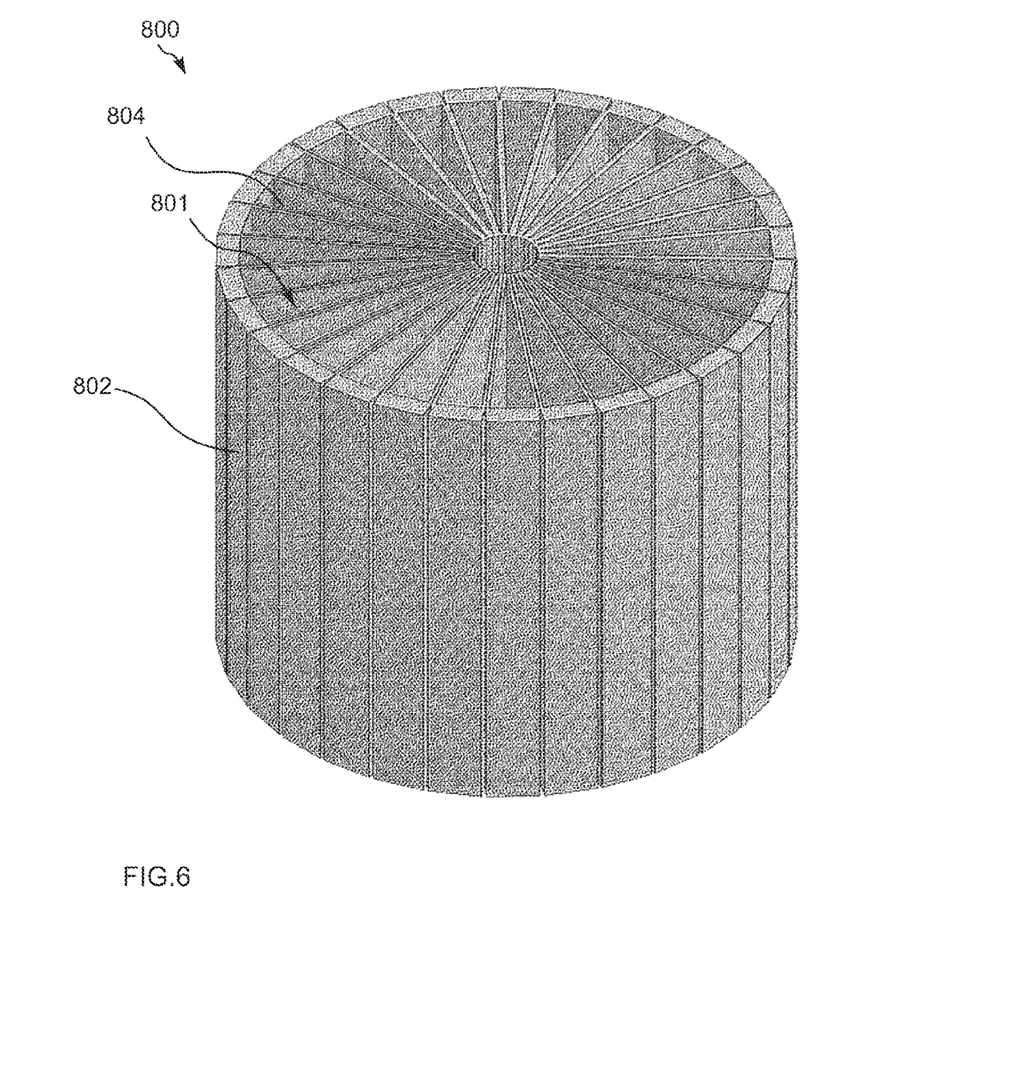
FIG. 6 is a top view of another scale-down system 800 in accordance with present disclosure.
Figure 7:
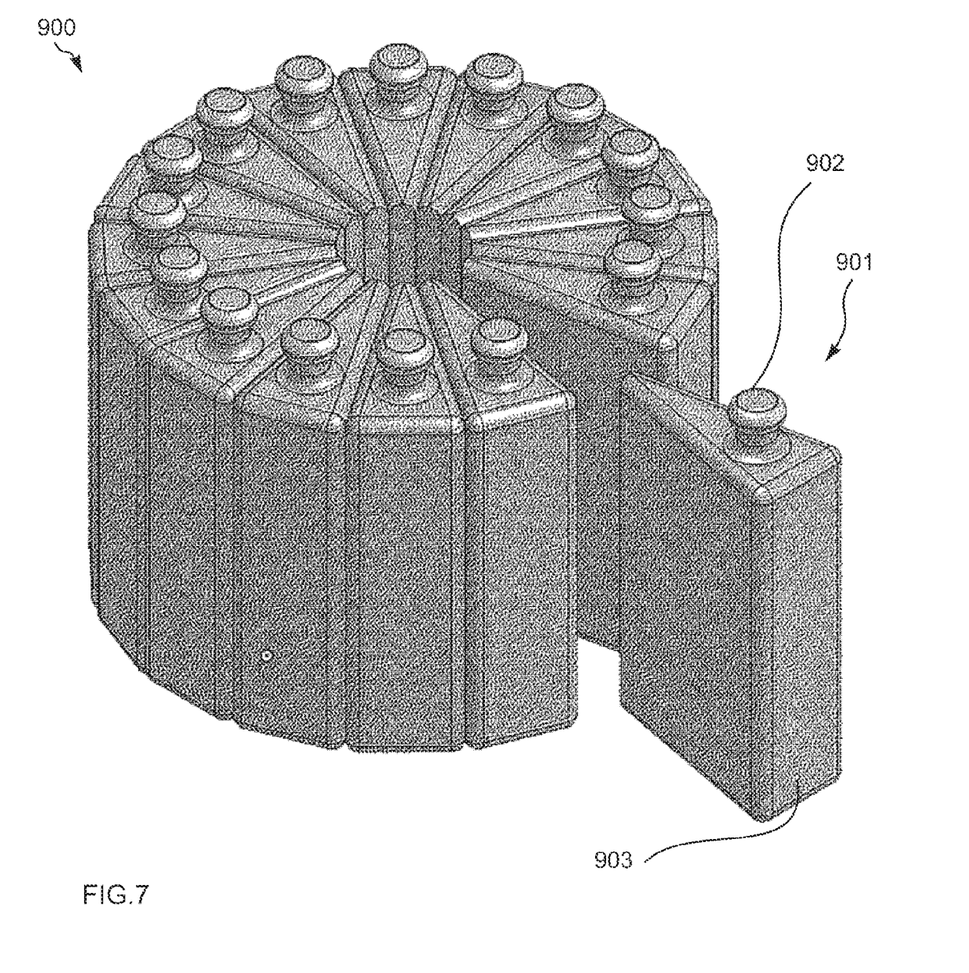
FIG. 7 is a top view of another scale-down system 900 in accordance with present disclosure.

In other embodiments of the scale-down system displayed in FIG. 6 and FIG. 7, the insulator 300 or 700 can be eliminated, by placing the scale-down containers, adjacent to each other, provided only the lateral active heat transfer walls are exposed to the outer heat transfer medium and all the remaining lateral vertical walls are placed in contact with other lateral vertical walls of other scale-down container. With this strategy it is possible to increase the number of scale-down containers per unit of volume, however it requires running multiple scale-down experiments simultaneously.

In the device 800 displayed in FIG. 6, the scale-down containers 801 with triangular cross-section are arranged in a circle. The lateral walls 804 of a given scale-down container are in contact with the lateral walls of the adjacent scale-down container. The device 800 is designed to be used with all the scale-down containers 801 filled with the pharmaceutical liquid mixture. If there is not sufficient pharmaceutical solution to process all the scale-down containers 801, an auxiliary aqueous solution with equivalent osmolality of the pharmaceutical solution may be used instead. This procedure is necessary, because the pharmaceutical solution or the auxiliary aqueous solution in the adjacent scale-down containers act like insulation and phase change material to ensure that there is not significant heat transfer across the lateral walls 804. For the same reason, all the scale-down containers must be filled to the same height of liquid.

The thickness of the outer active heat transfer wall 802 must be specified to ensure that the average overall heat transfer coefficient of the scale-down containers is equal to the corresponding large container.

In another embodiment of the disclosure 900 displayed in FIG. 7, the scale-down containers 801 shown in FIG. 6 are replaced by containers with a cap at the top 901 with triangular cross-section. Besides being closed in the top and having a cap 902, all the remaining features of the scale-down containers 901 are identical to the ones of the scale-down containers 801.

Preferentially, the devices 800 and 900 have the region above the head-space and the bottom walls insulated, to ensure that the heat transferred in the vertical direction is close to zero. Typical insulation should enable a heat transfer coefficient lower than 5 J/(m2·s·K). The insulator may have also an internal phase change material. The devices 800 and 900 may have also a circular heat exchanger, similar to the heat exchanger 400, attached to the outer active heat transfer walls 802 and 903.

Other embodiments of present disclosure can be obtained by replacing the heat exchanger 400 by a metallic block with internal flow of a temperature-controlled fluid or by a thermoelectric element (Peltier) whose temperature is controlled by electric current.

Preferentially, to immobilize the frozen core of the mixture inside the scale-down container during the thawing step, a small low-conductivity bar, strait or curved, with a diameter less than 5 mm, with a thermal conductivity less than 0.5 W m$^{-1}$ K$^{-1}$, can be inserted inside the container. Preferentially, the bar is attached to the wall of the container in the head-space or opening regions and ends in the region furthest away from the thermal active walls.

The term "comprising" whenever used in this document is intended to indicate the presence of stated features, integers, steps, components, but not to preclude the presence or addition of one or more other features, integers, steps, components or groups thereof.

It will be appreciated by those of ordinary skill in the art that unless otherwise indicated herein, the particular sequence of steps described is illustrative only and can be varied without departing from the disclosure. Thus, unless otherwise stated the steps described are so unordered meaning that, when possible, the steps can be performed in any convenient or desirable order.

Flow diagrams of particular embodiments of the presently disclosed methods are depicted in figures. The flow diagrams do not depict any particular means, rather the flow diagrams illustrate the functional information one of ordinary skill in the art requires to perform said methods in accordance with the present disclosure.

The disclosure should not be seen in any way restricted to the embodiments described and a person with ordinary skill in the art will foresee many possibilities to modifications thereof.

The above described embodiments are combinable.

The following claims further set out particular embodiments of the disclosure.

The invention claimed is:

1. A scale-down system for freezing and thawing aqueous liquid mixtures of thermo sensitive substances, wherein said scale-down system is configured for replicating the conditions of a large-scale container,
wherein said large-scale container has a head-space and a liquid-space, with a substantially constant transversal cross-section area in the liquid-space that does not change more than 20% with height and holds a volume of liquid (VL) at a height of liquid (HL), with a transversal cross-section area (ATL) that does not change substantially with height, and has a lateral heat transfer area (ALL) in contact with the liquid-space and an equivalent radius (RL) defined as 2ATL/(ALL/HL);
wherein said scale-down system comprises:
a scale-down container;
a holder for holding the scale-down container; and
an insulator;
wherein the holder is outwardly surrounded by the insulator such that the insulator insulates at least 50% of the lateral walls of the scale-down container and such that heat transfer of the scale-down container is equivalent to the heat transfer of the large-scale container;
wherein the scale-down first-container:
has a head-space and a liquid-space, with a substantially constant average transversal cross-section area (ATM) in the liquid-space that does not change substantially with height;
holds a volume of liquid (VM) for a height of liquid (HM);
has a lateral active heat transfer area (ALM), having an insulated lateral area (ALIM);
has an equivalent radius (RM) defined as 2 ATM/(ALM/HM), which is equal to the equivalent radius of the large-scale container
has an ALIM that is equal or greater than the ALM.

2. The system according to claim 1, wherein the insulator comprises a deformable layer arranged for contacting the scale-down container.

3. The system according to claim 2, wherein the deformable layer is made of a resilient material having low thermal conductivity selected from the group consisting of: extruded polystyrene foam, polyurethane foam, and acrylonitrile butadiene rubber.

4. The system according to claim 1, wherein the insulator comprises a frame arranged to press the scale-down container against the deformable layer such that thermal insulation is maximized.

5. The system according to claim 1, wherein the insulator has a cavity arranged to be filled with either a thermal insulation material or a phase change material; wherein the insulator comprises an insulation layer.

6. The system according to claim 5, wherein the phase change material is selected from the group consisting of: a mixture of water and ethylene glycol, a mixture of water and sodium chloride, and a mixture water and ethanol, provided that the phase change material so selected has the same osmolality of an aqueous liquid mixtures of thermo sensitive substance.

7. The system according to claim 6, wherein the phase change material further comprises a nucleating agent comprising either silver iodide or lead iodide.

8. The system according to claim 1, further comprising a second insulator for insulating a head-space region of the scale-down container, wherein the second insulator has a layer of a phase change material such that thermal insulation is maximized.

9. The system according to claim 1, further comprising a first removable heat exchanger having fins and a second insulation layer attached to a metallic support, wherein the first removable heat exchanger is attached to the lateral active heat transfer area of the scale-down container for use during freezing.

10. The system according to claim 9, wherein the second insulation layer has a thickness configured for obtaining an overall heat transfer coefficient between 1-100 W $m^{-2}$ $K^{-1}$ for natural air convection and between 10-100 W $m^{-2}$ $K^{-1}$ for forced air convention.

11. The system according to claim 9, wherein the second insulation layer is made of a plastic selected from the group consisting of: poly-ethylene, polypropylene, polycarbonate, and polylactic acid, or the plastic is made of an elastomer selected from the group consisting of: natural rubber, isoprene rubber, butadiene rubber, styrene-butadiene rubber and nitrile rubber.

12. The system according to claim 9, wherein the fins and metallic support are made of a metal, alloy or a high conductivity polymer.

13. The system according to claim 9, wherein the fins and the metallic support are made of a material with a thermal conductivity higher than 2 W $m^{-1}$ $K^{-1}$.

14. The system according to claim 1, further comprising a second removable heat exchanger, wherein the second removable heat exchanger is attached to the lateral active heat transfer area of the scale-down container for use during thawing.

15. The system according to claim 1, further comprising a metallic block with an internal flow of a temperature-controlled fluid or a thermoelectric element whose temperature is controlled by electric current, wherein the metallic block surrounds a portion of the first-scale-down container.

16. The system according to claim 1, wherein HM is approximately equal to HL and RM is approximately equal to RL.

17. The system according to claim 1, wherein the material of the walls of the scale-down container is the same of the walls of the large-scale container and wherein the ratio of average wall thickness between the scale-down container and large-scale container is in the range between 0.5 and 1.5.

18. The system according to claim 1, wherein the bottom surface of the scale-down container is insulated.

19. The system according to claim 1, wherein the surface around the head-space region is insulated in the scale-down container.

20. The system according to claim 1, wherein the active heat transfer surface of the scale-down container is attached to a heat exchanger.

21. The system according to claim 1, wherein the average overall heat transfer coefficient of the insulator is lower than 5 J/($m^2$·s·K).

22. The system according to claim 1, wherein a small low-conductivity bar with a diameter less than 5 mm and with a thermal conductivity less than 0.5 W $m^{-1}$ $K^{-1}$ is inserted inside the scale-down container and attached to the wall of the scale-down container in the head-space or opening regions and ends in the region furthest away from the thermal active walls.

* * * * *